106. COMPOSITIONS, COATING OR PLASTIC 84

Cross Reference

Examiner 194,629

UNITED STATES PATENT OFFICE.

ADDISON S. VORSE, OF DES MOINES, IOWA.

IMPROVEMENT IN ARTIFICIAL STONE.

Specification forming part of Letters Patent No. 194,629, dated August 28, 1877; application filed July 16, 1877.

106-76

*To all whom it may concern:*

Be it known that I, ADDISON S. VORSE, of Des Moines, Iowa, invented an Improvement in the Art of Making Artificial Stone, of which the following is a specification:

The object of my invention is to furnish a compound that is adapted for cementing together and hardening pulverized and granulated solids, to form artificial marble and stone of various grades of quality, and for different purposes. It consists in preparing a liquid compound and new article of manufacture and commerce, as hereinafter fully set forth.

I combine the following well-known articles in a solution, in any quantity desired, and in about the proportions named, to wit: Protoxide of lead, (litharge,) one (1) part; sulphate of zinc, (white vitriol,) one (1) part; pulverized alum, one (1) part; silicate of soda, three (3) parts.

These ingredients are dissolved in soft hot water, separately or together, using no more water than is necessary, and stirred together and chemically united to form a liquid compound that can be sealed up in barrels or other suitable vessels, and transported to any locality where artificial stone is to be made and used.

To make artificial marble or stone, I simply take hydraulic cement, sand, gypsum, lime, coal-ashes, or any of the well-known solids used for such purposes, and wet them with my solution, and reduce the mass to a plastic state that can be rammed into molds to form such articles of artificial marble or stone as may be desired. The quantity and quality of the plastic composition thus produced may vary as desired.

In making fine artificial marble the finest and best solids known for that purpose should be used. Coloring matter can be added to suit the fancy.

For building blocks, coarse sand and pebbles may predominate. A great variety of materials may be cemented together by means of my solution, and formed into building and paving blocks, vases, tiling, chimney-tops, &c., and numerous other useful articles, varying in size, grade, and quality.

I do not confine the use of my solution to any particular formula. It will give tensile and crushing strength to any concrete formed of particles that are made wet therewith, and packed together by ramming or pressure while the mass is in a plastic state.

Articles formed in molds should not be removed therefrom until sufficiently dry to retain their forms while being handled, and for a number of successive days the entire surface of each article should be made wet each day with my solution, by means of a painter's brush. This will produce a hard-finished surface that will be impervious to moisture and frost, and not liable to crack or chip, and susceptible of being polished.

To polish articles of marble and fine stone, made by means of my solution, I first wet the surface to be polished with linseed-oil or kerosene, and rub it in, and then apply a composition made of bleached gum-shellac, dissolved in alcohol, and filtered, copal varnish, oil of turpentine, and glycerine in about the following proportions: Gum-shellac, twenty (20) parts; copal varnish, one (1) part; oil of turpentine, one (1) part; glycerine, ten (10) parts.

With suitable cotton or linen I apply four or five coats of this polishing compound to the surface to be acted upon, and one drop of olive-oil on the rubber used as a polisher. Thus prepared, I rub the surface until it is perfectly smooth, and then I wet the rubber with alcohol, and operate it until the polished surface is dry and brilliant.

No skilled labor is required in thus producing finely-polished artificial marble mantles, table-tops, and similar products, that will be ornamental, serviceable, and durable.

Window caps and sills, and ornamental trimmings for buildings, and building-blocks made to resemble various kinds and colors of stone and marble can be readily produced by selecting the proper ingredients and coloring matter, and cementing them by means of my liquid composition.

I am aware that the component parts of my solution have been used in various combinations to aid in making artificial stone. My particular combination of the litharge, white vitriol, alum, and silicate of soda produces a new solution and article of manufacture that is greatly advantageous and valuable in the art of making concretes, betons, and articles of artificial marble and stone.

I claim as my invention—

Artificial stone or marble composed of either hydraulic cement, sand, gypsum, lime, coal-ashes, or similar solids, and a liquid compound containing protoxide of lead, sulphate of zinc, alum, and silicate of soda, in about the proportions specified, substantially as and for the general purposes set forth.

ADDISON S. VORSE.

Witnesses:
E. F. COCHRAN,
ARTHUR STIMSON.